United States Patent
Kuriuzawa et al.

(10) Patent No.: US 6,385,144 B1
(45) Date of Patent: May 7, 2002

(54) STORAGE DEVICE WITH MEANS FOR EFFICIENTLY POSITIONING A HEAD ON A DISK INCLUDING GUARD AREAS LACKING POSITION INFORMATION

(75) Inventors: Toshio Kuriuzawa, Tokyo; Shigenori Yanagi, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/467,311

(22) Filed: Dec. 20, 1999

(30) Foreign Application Priority Data

Dec. 22, 1998 (JP) .......................................... 10-364872

(51) Int. Cl.[7] .............................................. G11B 17/22
(52) U.S. Cl. .................................. 369/30.12; 369/30.27
(58) Field of Search ........................... 369/32, 33, 47.1, 369/275.3, 44.28, 44.27, 44.29; 360/77.02, 78.01, 78.04, 78.11

(56) References Cited

U.S. PATENT DOCUMENTS

| 4,942,486 | A | * | 7/1990 | Kutaragi et al. | 360/48 |
| 5,010,423 | A | * | 4/1991 | Sakaegi et al. | 360/77.06 |
| 5,012,460 | A | * | 4/1991 | Popovich et al. | 369/32 |
| 5,173,886 | A | * | 12/1992 | Satoh et al. | 369/32 |
| 5,231,550 | A | * | 7/1993 | Hashimoto | 360/78.06 |
| 5,305,159 | A | * | 4/1994 | Sakai et al. | 360/77.02 |
| 5,953,309 | A | * | 9/1999 | Yoshimoto et al. | 369/275.3 |

* cited by examiner

Primary Examiner—Tan Dinh
(74) Attorney, Agent, or Firm—Greer, Burns & Crain, Ltd.

(57) ABSTRACT

A storage device includes a disk medium having tracks in a plurality of guard areas which do not have ID information. Control means controls the head driving means by preventing positioning of the head to the guard areas. The device assures highly reliable and high speed access even when density is high by ensuring movement and positioning of the head across the storage medium in data areas which have ID information.

13 Claims, 12 Drawing Sheets

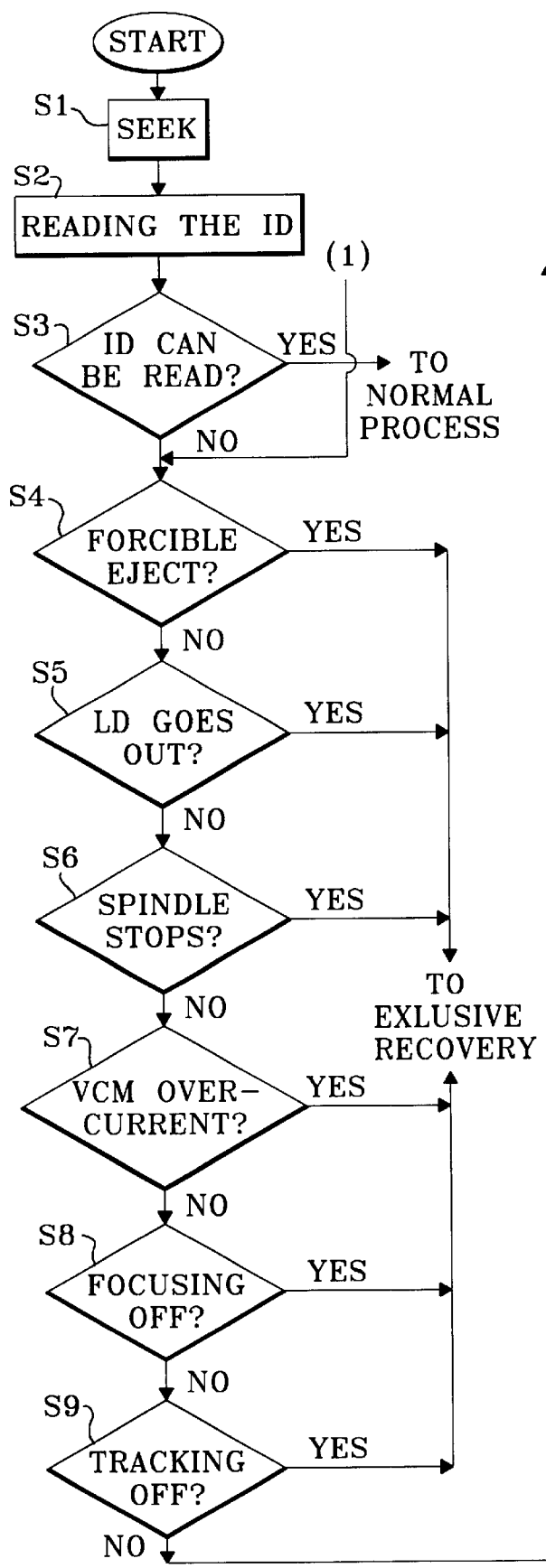
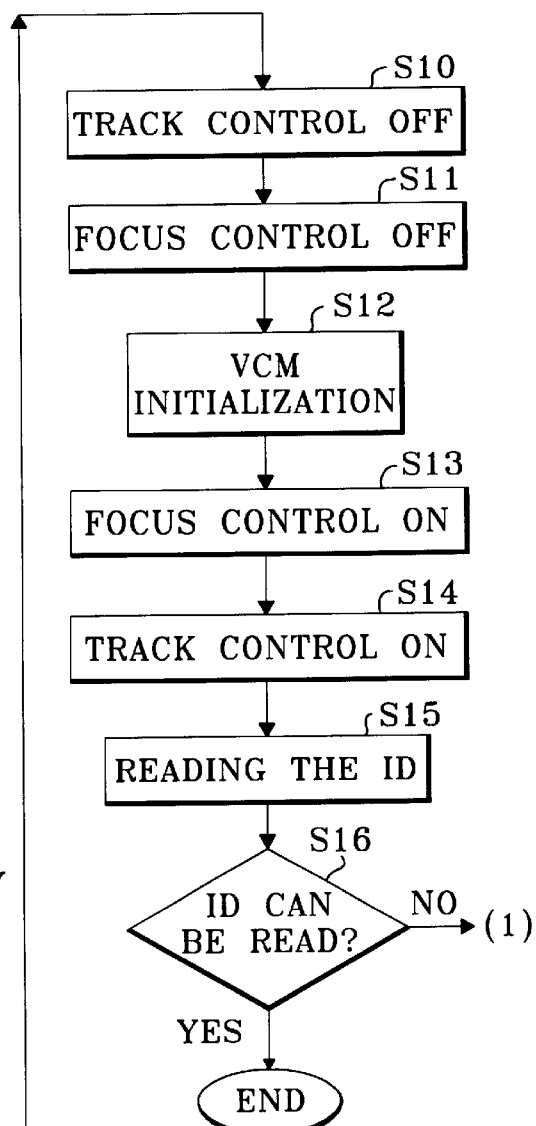
Fig. 3

STORAGE DEVICE WITH MEANS FOR EFFICIENTLY POSITIONING A HEAD ON A DISK INCLUDING GUARD AREAS LACKING POSITION INFORMATION

The present invention relates to control of movement of a head in a storage device which can use a medium having concentric or spiral tracks. More particularly, the invention relates to head position control in storage devices having a plurality of guard areas which do not include position information (ID).

BACKGROUND OF THE INVENTION

In recent years, disk type computer media such as phase change type disks and magneto-optical disks or the like are being developed, in addition to floppy disk, hard disk and card/tape type optical storage technology.

In comparison with a floppy disk or a hard disk, an optical disk is capable of drastically increasing the recording capacity by forming recording pits of the sub-micron order on the medium, using a laser beam.

Moreover, information rewriting of a hundred thousand times or more is possible for a magneto-optical disk utilizing a rare earth-transition metal based material, and expectations are high for this magneto-optical disk. Recently, development has been made for such an optical disk having storage capacity of 540 MB to 640 MB at one surface of a 3.5 inch disk.

The storage capacity of a typical floppy disk of 3.5 inch is about 1 MB, so the storage capacity of an optical disk is equal to that of 540 to 640 floppy disks. As described, an optical disk is a rewritable storage medium having a much higher recording density.

However, the recording density of an optical disk must be further raised from the current density, in preparation for the future multi-media era. In order to raise the recording density, more pits must be recorded on the medium. Therefore, the current pit must be further reduced in size and the interval between pits must also be reduced.

In the case of raising the recording density with such a method, the wavelength of the laser beam has to be further reduced from the current 670 nm, but when practical use is considered, the pit size must be reduced even in the current wavelength of 670 nm.

It is possible to form the pit smaller than the beam diameter by controlling the power of the laser beam when recording. However, in regard to reproduction, when a pit smaller than the beam diameter is formed, crosstalk with a neighboring pit increases. In the worst case, the neighboring pit is entered in the reproduced beam. Thus, normal reproduction is very difficult when practical use is considered.

As a method for reproducing the pit smaller than the beam diameter in the current wavelength of 670 nm, MSR (Magnetically induced Super Resolution) has been proposed. The principle of MSR, namely rare earth—transmission metal based film material of a magneto-optical recording medium layer consisting of a reproducing layer, a switch layer (intermediate layer) and a recording layer, and a method of manufacturing a magneto-optical storage medium, are disclosed in detail in Japanese Published Unexamined Patent Application Nos. HEI 7-244877, HEI 9-147436 and HEI 10-134429, and others.

An optical storage medium used in an optical disk apparatus has, as illustrated in FIG. 1, concentric or spiral tracks divided into a plurality of sectors. The sectors are alternately provided with recording areas (DATA areas) for recording and/or reproducing data and header areas (ID area) formed of the recessed and projected pits.

In the ID area, a sector mark (SM) indicating the position of a sector, position information (ID information) such as track number, sector number, etc. and VFO such as a synchronous pattern are recorded.

The target sector of the target track can be positioned by the relative movement (tracking) of the head in the traveling direction (track following direction) 121 with rotation of the optical storage medium.

Moreover, the operation for moving the head with a carriage or lens actuator (track actuator) in the direction (disk medium radius direction) 123 crossing the tracks in order to move the head to the target track at a high speed to record/reproduce the information on the medium is called the seek operation.

Under the seek control, when the ID (track No., sector No.) is issued, as the target position of movement, via an interface controller from a host, the optical disk apparatus immediately reads the ID (track No., sector No.) of the current position with the carriage 122 in order to identify the current position.

The amount of movement required, i.e., the difference between the target position and the current position, is calculated with the MPU. This amount of movement is converted to the number of tracks to be jumped and it is then set to a DSP (Digital Signal Processor) as a VCM (Voice Coil Motor) drive controlling means for driving the carriage 122. Therefore, the carriage executes the seek operation in the traveling direction 123 by instructing a drive current of the VCM from the DSP via the driver.

For the storage medium of the related art, ID exists for all tracks in the range where the head moves, namely in the track jump range of the track actuator in which the lens can precisely move in the track crossing direction and in the seek range of the carriage. Therefore, the current position (track No., sector No.) can be detected immediately by reading the ID.

In these years, a high density storage medium in which track interval is reduced from the current interval to form more tracks by utilizing the MSR technology is being developed. Almost all optical disk media employ the ZCAV system, in which a predetermined number of tracks are defined as one zone and control for making the angular velocity constant is performed for a plurality of zones.

The latest high density storage medium technology has a problem in the recording, erasing and reproducing operations at the boundary of zones, due to realization of higher track density.

Therefore, as illustrated in FIG. 2, guard areas are provided between zones of tracks (track grooves are formed like ordinary tracks) but the ID area and DATA area do not exist in the track at the boundary of zones. Accordingly, the number of guard areas depends on the number of zones.

Guard areas prevent interference with respective tracks of neighboring zones, and are used because track density is higher than it is in the related art. Namely, about 10 tracks are provided in one guard area. Although it is a matter of course, the data areas in the ordinary tracks have the ID area and DATA area as in the case of FIG. 1.

When the head is positioned (on-track) to this guard area in the seek method of the related art, since ID does not exist, as illustrated in FIG. 3, an error that ID cannot be read is judged and therefore the ordinary error recovery process, which is based on the to existence of ID, is executed.

However, in the high density storage medium of the new system, ID cannot be read even with any kind of method because the ID does not intrinsically exist. Accordingly, the track number and sector number cannot be recognized and error recovery is conducted for a long period of time. As a result, time is wasted. In addition, a seek error is also generated, lowering reliability of the medium and apparatus.

FIG. 3 illustrates the recovery process when ID cannot be read in the medium of the related art. The ordinary recovery process means this flowchart. The step S1 indicates that the target track is instructed and seek is completed. In order to detect the seek end position, the ID is read in step S2.

As a result, operation transfers to the ordinary process when ID can be read in step S3. If ID cannot be read, the recovery process starts from step S4. Factors for searching for the cause of error are sequentially detected.

In step S4, it is determined whether or not forcible ejection is occurring. If it is a cause, exclusive recovery is conducted. When it is not a cause, whether LD is erased or not is detected in step S5.

When it is not a cause, it is detected in step S6 whether or not the spindle is stopped. If it is a cause, exclusive recovery is conducted. When it is not a cause, whether VCM over-current is detected in step S7. If that is a cause, exclusive recovery is conducted. When it is not a cause, defocusing is detected in step S8.

If defocusing is a cause, exclusive recovery is conducted. When it is not a cause, out of track condition is detected in step S9. If an out of track condition is a cause, exclusive recovery is conducted. When a factor is not yet detected even in this step, the recovery process is not conducted, and initialization is conducted to prepare for another recovery process if needed. Track control is turned off in step S10. Focus control is then turned off in step S11.

VCM initialization is conducted in step S12. Focus control is turned on in step S13. Track control is then turned on in step S14. Thereafter, ID is read again in step S15. When ID is read in step S16, the process is completed normally. If ID cannot be read normally, retry is conducted after returning to (1).

Since the guard area of the latest high density medium is in the track where the ID does not exist, when the recovery process of the related art is conducted, even if retry is repeated many times after returning to (1), ID cannot be read. Therefore, head position, namely optical beam position, cannot be recognized and more time is wasted, which of course has an adverse effect on the seek process.

The amount of seek can be measured by detecting the number of tracks which are crossed by the head, but as track density increases, and moreover as the moving distance (difference) of the head increases in the seek operation, the possibility for detection mistakes increases.

Namely, when the difference is large and the target track is set to the area near the guard area, the head is liable to seek the guard area and enter the guard area erroneously.

It is therefore an object of the present invention to provide a storage device which can realize high speed access to the target position with higher reliability even with higher density tracks and guard areas in the medium by not seeking to guard, avoiding erroneous seeks to guard areas when seeking an area near the guard area, and by conducting recovery control when seek is conducted to the guard area.

SUMMARY OF THE INVENTION

A storage device of the present invention can use a storage medium including a data area having position information at least indicating the position to reproduce data, and a guard area not having the position information. The storage device includes a head for reproducing at least data, a head driving means for moving the head from a current (or initial) position to a target position on the storage medium, and a control means for controlling the drive of the head driving means by instructing the head to move up to the target position from the current position. Throughout this specification, the terms "current position" and "initial position" are both used interchangeably to refer to the starting position of the head, with respect to the medium, prior to moving the head in a track jump or seek operation. In the preferred embodiment of the present invention, the control means controls the drive of the head driving means by instructing the driving means to prevent the head from being moved to the guard area when the storage medium is a storage medium having a guard area.

Moreover, when the target position is set at an area near the guard area, the control means instructs the amount of compensated movement obtained by directing the amount of compensation needed for movement up to the target position from the current position of the head.

Moreover, the control means instructs, as the moving control condition, the amount of compensated movement obtained from the amount of compensation, determined depending on the amount of movement up to the target position from the current position of the head.

In addition, the control means assures that the amount of compensated movement when the amount of movement is large is larger than the amount of compensated movement when the amount of movement is small.

In one embodiment, the control means does not conduct movement of the head by the head driving means and issues an error when the instruction to move the head to the guard area is issued from a host.

In another embodiment, the control means controls the drive of the head driving means, when the head is positioned in the guard area, by instructing movement of the head to the data area from the guard area.

In still another embodiment, the control means causes the guard area to draw back by controlling the head to follow the spiral track for a predetermined period of time.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 3 is a flowchart of the ordinary recovery process when the ID cannot be read;

DETAILED DESCRIPTION

Figure 4:
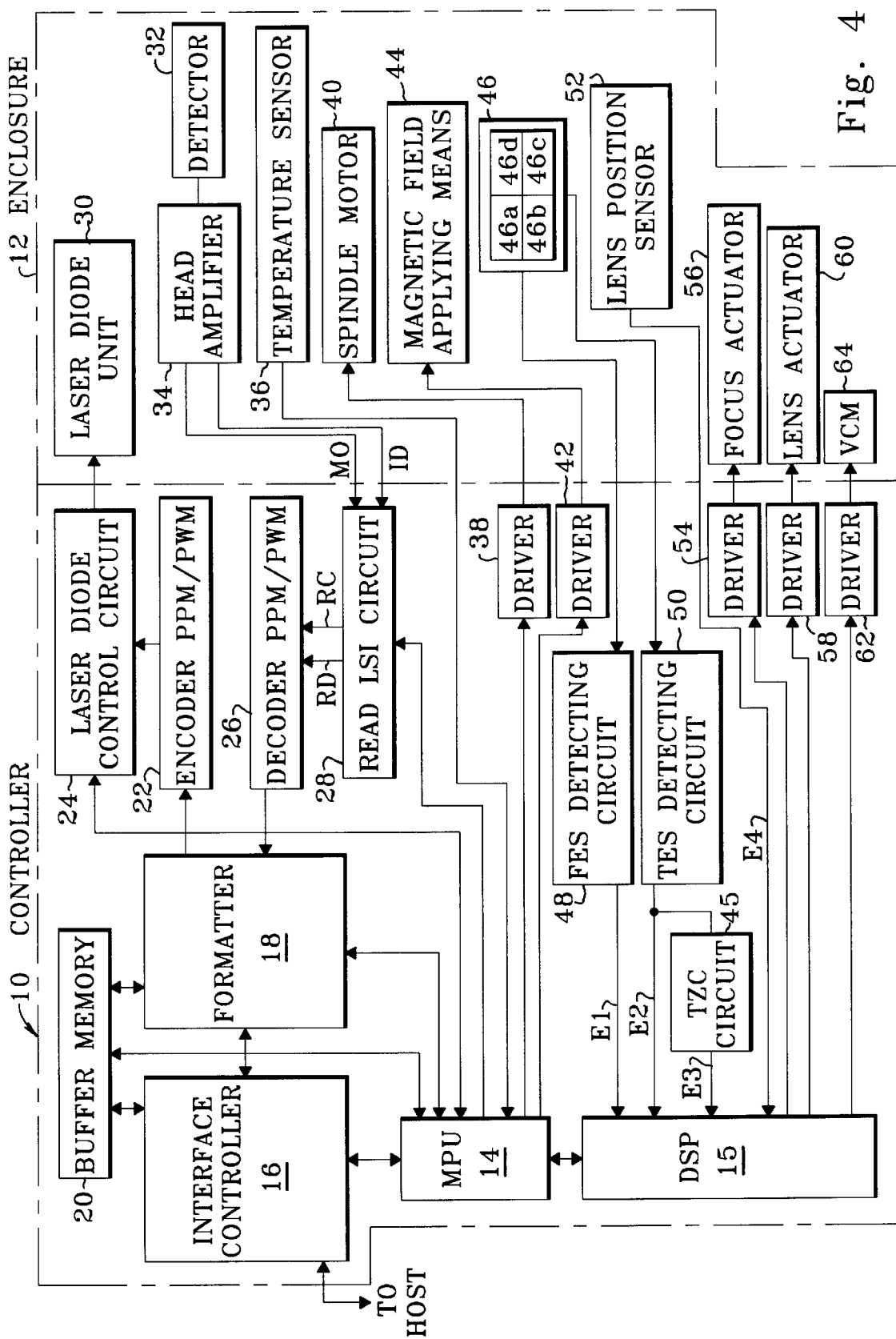
FIG. 4 is a block diagram of an optical disk apparatus of the present invention.

FIG. 4 is a circuit block diagram of an optical disk apparatus of the present invention. The optical disk apparatus is roughly classified into a controller 10 and an enclosure 12.

The controller 10 has MPU 14 to conduct total control of an optical disk apparatus, an interface controller 16 for exchanging commands and data with a host apparatus, and a buffer memory 20 which is used in common by a formatter 18, the MPU 14, and the interface controller 16. The formatter 18 conducts the format process used to write data to an optical disk medium, and the ECC process used to read data.

An encoder 22 and a laser diode control circuit 24 are provided as the write system for the formatter 18 and a control output of the laser diode control circuit 24 is applied to the laser diode unit 30 provided in the optical unit in enclosure 12.

Figure 1:
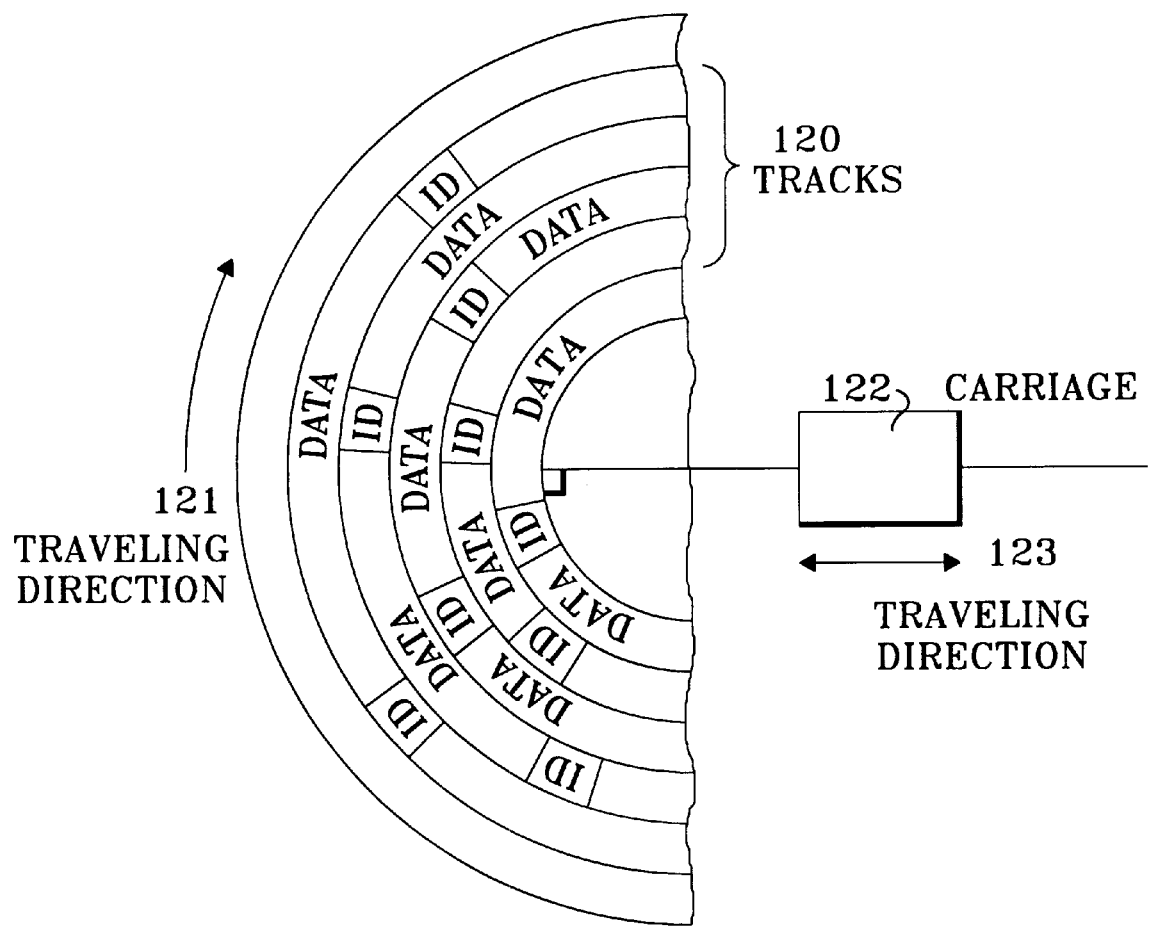
FIG. 1 is an enlarged view of a portion of a disk medium of the related art for explaining the positional relationship between the disk traveling direction and carriage.
Figure 2:
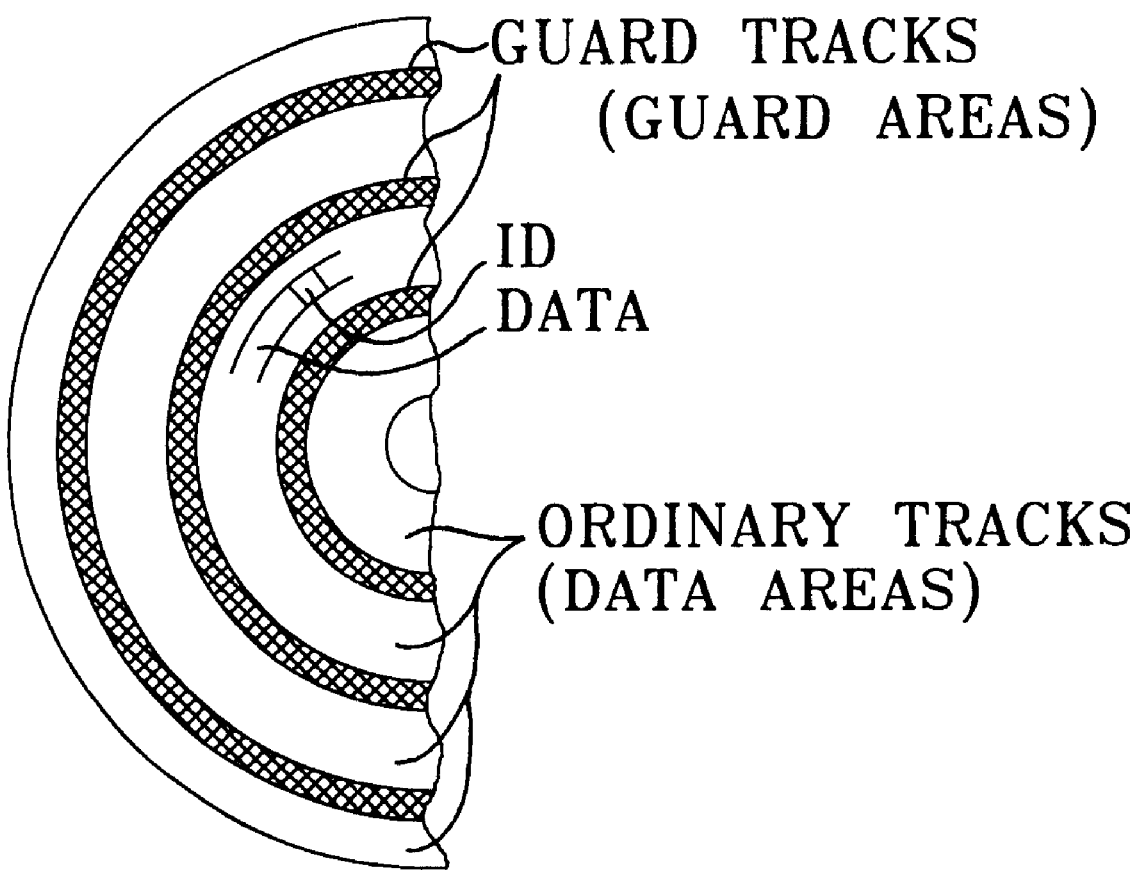
FIG. 2 is a diagram of a portion of the latest high density medium having guard areas.

The laser diode unit 30 is integrally provided with a laser diode and a light receiving element for monitoring purposes. A magneto-optical disk medium is suitable, such as a reprogrammable MO cartridge medium, for recording or/and reproducing data using the laser diode unit 30. It is possible in this embodiment to use a medium of the related art in which ID areas and data areas exist in all tracks, as illustrated in FIG. 1, or the latest high density medium in which ID areas and data areas exist in some of the tracks, as illustrated in FIG. 2.

As the medium of the related art, a magneto-optical disk cartridge conforming to ISO of 128 MB, 230 MB, 540/640 MB, which are available in the market, is assumed. Moreover, as the latest high density medium, a large capacity magneto-optical disk cartridge of 1.3 GB or more, which is now under development, is assumed.

It is apparent that when the guard area is provided, the technology of the present invention can be applied in the event that a magneto-optical disk cartridge of 128 MB, 540/640 MB is newly developed, and to the processing apparatus of a storage medium such as a hard disk, floppy disk, phase change type optical disk and DVD or the like in addition to the magneto-optical disk.

In addition, the recording system of the medium employs pit position recording (PPM recording) for recording data corresponding to the existence of a mark on the medium, or pulse width recording (PWM recording) in which the edges of a mark, namely front and rear edges, correspond to data. Moreover, the recording formatter of the medium can be ZCAV divided to a plurality of zones.

When an MO cartridge is loaded into an optical disk apparatus, the ID area of the medium is first detected. The type of medium is recognized by the MPU 14 from the pit interval and the type of format is sent to the formatter 18. Thereby, the format process corresponding to medium capacity, PPM or PWM recording is conducted.

As the read system for the formatter 18, a decoder 26 and a read LSI circuit 28 are provided. To the read LSI circuit 28, a receiving light beam of the returning beam from the laser diode 30 by a detector 32 provided in the enclosure 12 is input as the ID signal and MO signal via a head amplifier 34.

The read LSI circuit 28 is provided with the circuit functions of the AGC circuit, filter, sector mark detecting circuit, synthesizer and PLL, etc. to generate the read clock and read data from the input ID signal and MO signal and then output these signals to the decoder 26.

Moreover, if the zone CAV method is employed as the recording system of a medium by the spindle motor 40, switching control of clock frequency corresponding to particular zones is conducted for the comprised synthesizer by the MPU 14 for the read LSI circuit 28.

The modulating system of encoder 22 and demodulating system of decoder 26 are changed to the modulating and demodulating systems of the PPM recording and PWM recording, depending on the type of medium by the formatter 18. Moreover, in some cases, the control area formed by uneven pits is provided at the internal and external circumferences of the medium, and the type of information on the medium is obtained from such information. Medium type can be detected by reading the control area whether a medium is the over-write medium or not. Therefore, the recording condition which is different for each medium can be read from the memory, and it is then set as the condition of each mechanism of the apparatus.

To MPU 14, a detecting signal of a temperature sensor 36 provided in the side of the enclosure 12 is given. MPU 14 controls each light emitting power of the read, write and erase operations in the laser diode control circuit 24 to the optimum value based on the environmental temperature in the apparatus detected by the temperature sensor 36. MPU 14 controls, with a driver 38, the spindle motor 40 provided in the side of the enclosure 12.

Since the recording format of the MO cartridge is ZCAV, the spindle motor 40 is rotated in the constant velocity, for example, of 4200 rpm or 3600 rpm. (The number of rotations can be set to different values depending on the type of device.) Moreover, MPU 14 controls a magnetic field applying means 44 provided in the side of the enclosure 12 via a driver 42.

The magnetic field applying means 44 is arranged in the opposite side of the beam radiating side of the MO cartridge loaded in the apparatus to supply the external magnetic field to the medium during the recording, erasing and reproducing operations. As the magnetic field applying means 44, an electromagnet is usually used, but it may be replaced with a combination of an electromagnet and a permanent magnet.

DSP 15 has a function as a servo controller to position the beam from the laser diode 30 on the medium, based on the instruction from the MPU. Therefore, 4-split detectors 46a, 46b, 46c, 46d for receiving the returning light beam from the medium are provided in the optical unit in the enclosure 12 side, a focus error signal is given to DSP 15 through an FES detecting circuit (focus error signal detecting circuit) 48 and the automatic focus control means realized by DSP 15 performs the feedback control of a focus actuator 56 to minimize the focus error signal.

A TES detecting circuit (tracking error signal detecting circuit) 50 generates a tracking error signal from the light receiving output of the 4-split detector 46, inputs this signal to DSP 15, then inputs to TZC circuit (track zero cross detecting circuit) 45 and then to DSP 15.

Moreover, in the enclosure 12 side, a lens position sensor 52 is provided to detect the lens position of the objective lens for radiating the laser beam to the medium and inputting the lens position detecting signal (LPOS) to the DSP. DSP 15 controls the drive of focus actuator 56, lens actuator 60 and VCM 64 via drivers 54, 58, 62 for the purpose of beam positioning.

Figure 5:
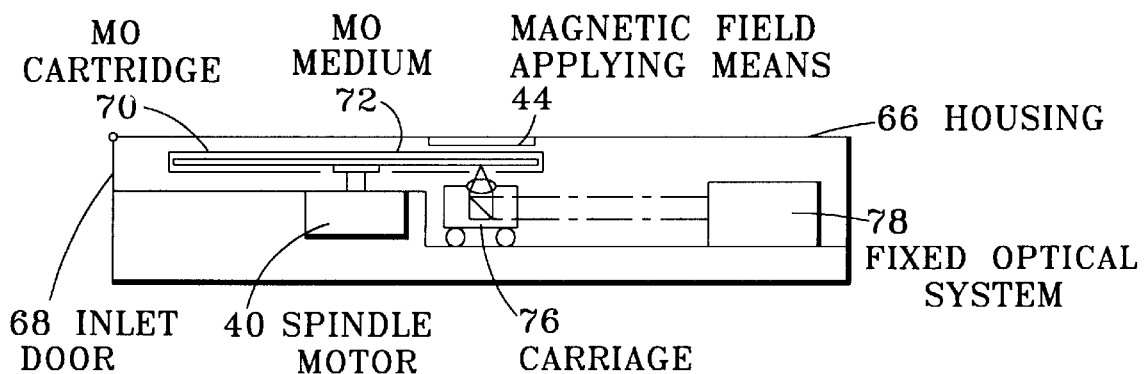
FIG. 5 is a diagram for explaining an internal structure of the apparatus to which an MO cartridge is loaded.

The enclosure in the optical disk apparatus is outlined in FIG. 5. In FIG. 5, the loading in which the internal MO medium 72 is loaded to the hub of the rotating shaft of the spindle motor 40 is performed by providing the spindle motor 40 within the housing 66 and then inserting the MO cartridge 70 to the hub of the rotating shaft of the spindle motor 40 from the inlet door 68 side.

At the lower side of the MO medium 72 of the MO cartridge 70 loaded, a carriage 76 which can be freely moved by VCM 64 in the direction to cross the medium tracks is provided. An objective lens 80 is mounted on the carriage 76 so that the beam is incident via a prism 82 from the semiconductor laser provided in the fixed optical system 78, and thereby the beam spot is focused on the medium surface of the MO medium 72.

The objective lens 80 is controlled, by the focus actuator 56 shown in the enclosure 12 of FIG. 4, to move in the optical axis direction and is also controlled by the lens actuator (track actuator) 60, to move, for the lens seek, within the range, for example, of several tens of tracks in the radial direction to cross the medium tracks. For more movement, the carriage 76 is moved by VCM 64 for the carriage seek. The position of the objective lens 80 mounted on the carriage 76 is detected by the lens position sensor 52 of FIG. 4.

In the case of a product in which the track actuator is eliminated to improve performance of the VCM and the VCM covers the function of the track actuator for the purpose of cost reduction, only the carriage seek is conducted and therefore the present invention is employed for this carriage seek.

Moreover, a magnetic field applying means 44 which is extended in the radial direction is arranged at the opposite side of the beam radiating surface of the MO medium 72. In addition, as the magnetic field applying means 44, a means having the slide structure to be mounted to the carriage 76 for applying the external magnetic field to the beam radiating position of the MO medium 72 may be used.

In the following embodiment, carriage seek will be explained. The concept of the present invention will also be applied to the lens seek. In this case, the track actuator for driving the objective lens is controlled in place of controlling the VCM (voice coil motor) to drive the carriage. The process for compensating the amount of movement may be changed a little in the calculating formula to obtain the amount of compensation depending on the characteristics of the apparatus, but the basic concept of shifting in the forward and backward direction for the guard area is not changed.

In the seek operation of the present invention, the current position ID is read with the detector 32 and head amplifier 34 forming a part of the structure of the enclosure 12 of FIG. 5. The difference between the target position and current position is calculated with MPU 14 via the interface controller 16 from the target track instructed by the host apparatus, and the amount of compensation is further adjusted and the amount of track jump obtained is given to DSP 15 to actually operate VCM 64 through the driver 62 in order to realize the seek operation of the carriage of FIG. 6.

In the following embodiment, use of an optical storage medium having a guard area where ID does not exist will be explained as an example.

Figure 6:
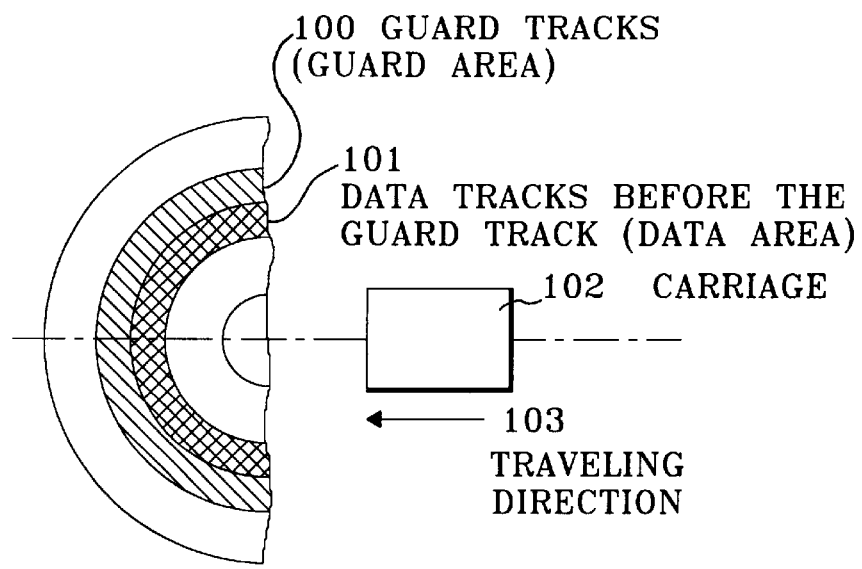
FIG. 6 is a diagram for explaining seeking when the target track is before the guard area.

FIG. 6 illustrates the relationship between the carriage and medium for seeking the forward track of the guard area. A medium has a circular shape but half is omitted.

The target track instructed from a host apparatus is the guard forward track 101 and the guard area 100 exists after the traveling direction 103 of the carriage 102 for the target track, indicating the possibility of the carriage entering the guard area if it conducts excessive seek erroneously in the traveling direction due to a track counting mistake.

Therefore, the track number of the guard area and ID such as the track number of the track in the forward area of the guard area are previously registered to the memory in order to detect whether the relevant ID corresponds to the guard area or the forward guard area.

Namely, since there is no ID area in the guard area, information on the track cannot be read, if it is attempted. But, the track is previously formed as the uneven area and the track number is previously determined with the track number from the beginning. For example, when 10,000 tracks in total are provided and 1200 to 1210 tracks, 3200 to 3210 tracks, etc. are determined to be provided in the guard area, the MPU can recognize, from the memory, whether the target track is provided in the guard area or not.

Here, if the carriage enters the guard area due to the erroneous seek, it suggests that such event occurs as a result of excessive seek in the traveling direction. Therefore, compensation is required not to allow the excessive jump of the seek in order to avoid entering the guard area.

Therefore, since the VCM is driven via DSP during the seek operation and the amount of track jump (number of crossing tracks) is instructed by the MPU, this amount of track jump must be adjusted to be lower than the ordinary value. In other words, a change in the amount of movement means setting, as a result of the seek operation, to the area before the guard area.

Therefore, it is probable that the carriage cannot reach the target track for recording/reproduction only with the single seek operation, but when the time required for recovery by the on-track to the guard area is considered, it will be better, from the point of view of processing time, to move the head to the target track by the repeated seek operation or track jump, and reliable positioning can be made. Moreover, in this case, load of the control is eased. Details of the compensating method will be explained later.

Figure 7:
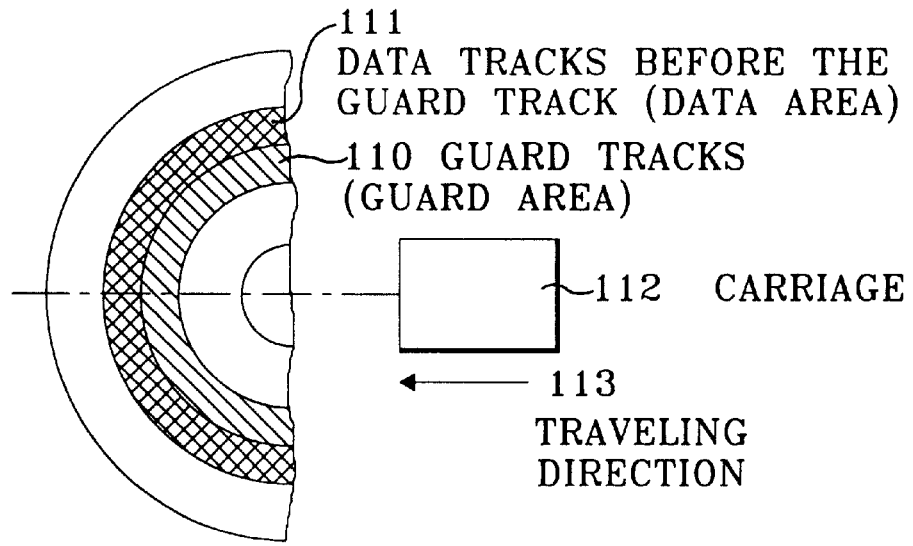
FIG. 7 is a diagram for explaining seeking when the target track is after the guard area.

FIG. 7 illustrates the relationship between the carriage and medium when the seek operation is conducted to the track provided after the guard area. This figure illustrates that the target track instructed from a host apparatus is located at the track 111 after the guard 110, the guard area exists at the forward area in the traveling direction 113 of the carriage 112 of the target track, and the carriage enters the guard area when it erroneously seeks the forward area in the traveling direction due to the track count mistake.

Therefore, the ID such as the track number of the guard area and the track number of the track located after the guard area is previously stored in the memory to detect that the relevant ID corresponds to the guard area or the area after the guard area.

Here, when seeking to the guard area due to erroneous seeking means that seeking is made to the forward area in the traveling direction, so compensation is required to realize an excessive jump for the seek operation, in order to avoid seeking to the guard area.

Therefore, since the VCM is driven via DSP in the seek operation when the amount of track jump (number of crossing tracks) is instructed by the MPU, compensation for enlarging the amount of track jump over the ordinary value is required. In other words, the amount of movement is changed, as a result, to include the area of the guard area in addition to the distance to target track for data recording/reproduction.

Figure 8:
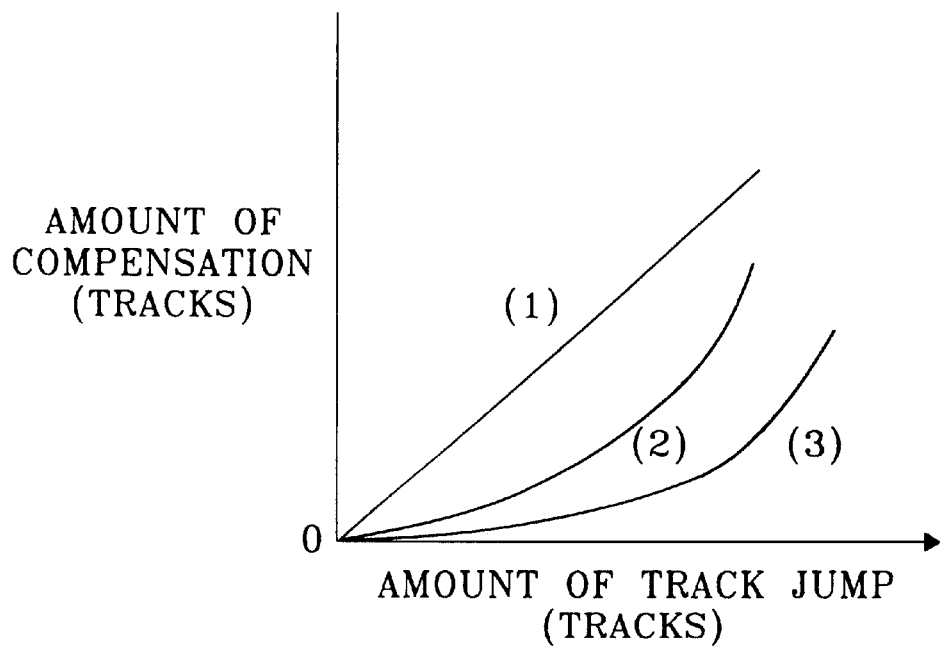
FIG. 8 is a characteristic diagram of the amount of compensation as a function of the amount of track jump.

FIG. 8 illustrates a characteristic diagram relating the amount of compensation to the amount of track jump. The seek distance is the number of tracks jumped (crossed). Moreover, the seek instruction is determined by the numerical value indicating the number of tracks.

Whether the carriage has conducted the seek process as instructed or not can be detected by detecting the number of tracks which the carriage has jumped. However, as the seek distance becomes longer, and as the number of tracks jumped becomes larger in the optical disk apparatus, the more difficult the detection of the number of tracks becomes. Therefore, an error from the actual number of tracks jumped tends to increase.

Therefore, the relationship between the amount of track jump and the amount of compensation changes proportional to the amount of track jump, as shown in FIG. 8. In this case, it may show the change like a linear function such as (1), or a quadratic function such as (2). The actual change is indicated by the characteristic (3) of FIG. 8 and the amount of compensation X (a number of tracks) can be calculated by the following formula.

$$X=(D \times D)/2^{22} \text{ (tracks)}$$

Here, D is the difference between the initial track and the destination track and $2^{22}=419304$ (value obtained by simulation).

Figure 9:
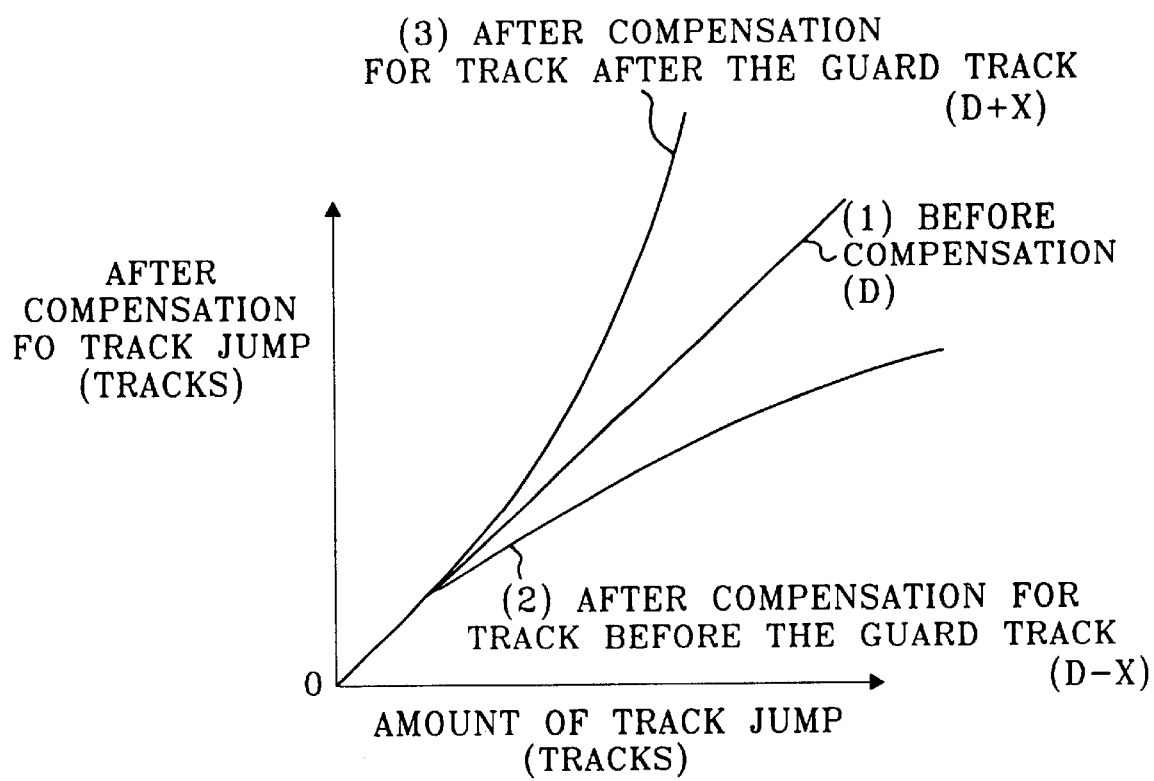
FIG. 9 is a characteristic diagram of the amount of track jump after compensation as a function of the actual amount of track jump, when seeking is conducted to the tracks before and after the guard area.

FIG. 9 illustrates the characteristic relation between the amount of track jump after compensation when conducting the seek operation to the area before and after the guard area. Characteristic (1) is the characteristic before compensation, namely the characteristic indicating the same numerical value as the amount of track jump for the purpose of comparison.

Meanwhile, characteristic (2) is the characteristic after compensation for the area before the guard area, in which the value becomes smaller by compensation than the characteristic before compensation when the amount of track jump increases. Moreover, characteristic (3) is the characteristic after compensation for the area after the guard area, in which the value becomes larger by compensation than the characteristic before compensation when the amount of track jump increases.

Regarding the relationship between FIG. 8 and FIG. 9, those obtained by subtracting FIG. 8(3) from FIG. 9(1) becomes equal to FIG. 9(2) when seeking is conducted to the area before guard area, while those obtained by adding FIG. 8(3) to FIG. 9(1) becomes equal to FIG. 9(3) when that seeking is conducted to the area after the guard area.

Figure 14:
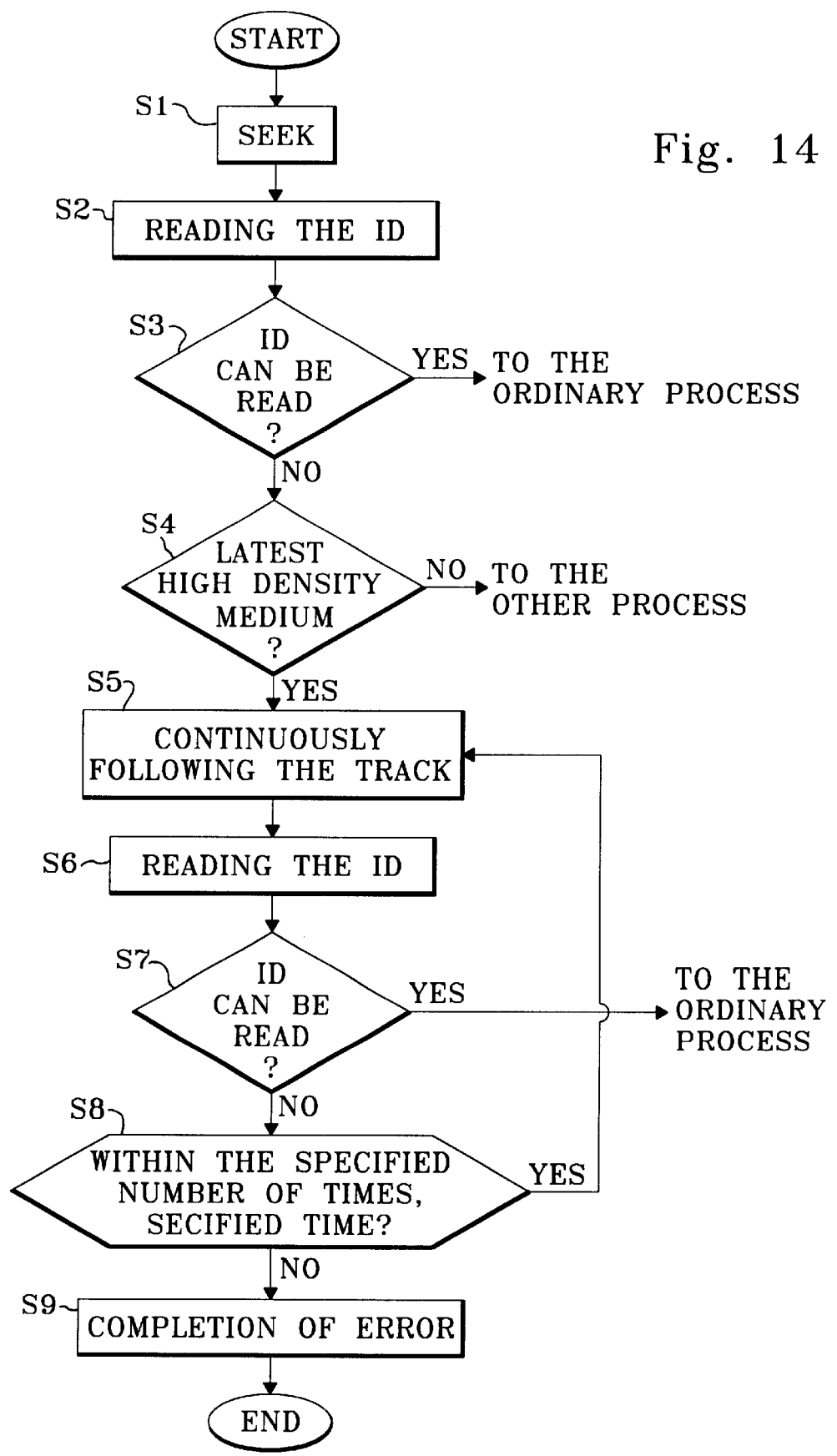
FIG. 14 is another flowchart of the recovery process when seeking is erroneously conducted to the guard track.

The characteristic after this compensation is instructed to DSP 15 of FIG. 14 to operate the carriage 76 of FIG. 5 via VCM 64.

Figure 10:
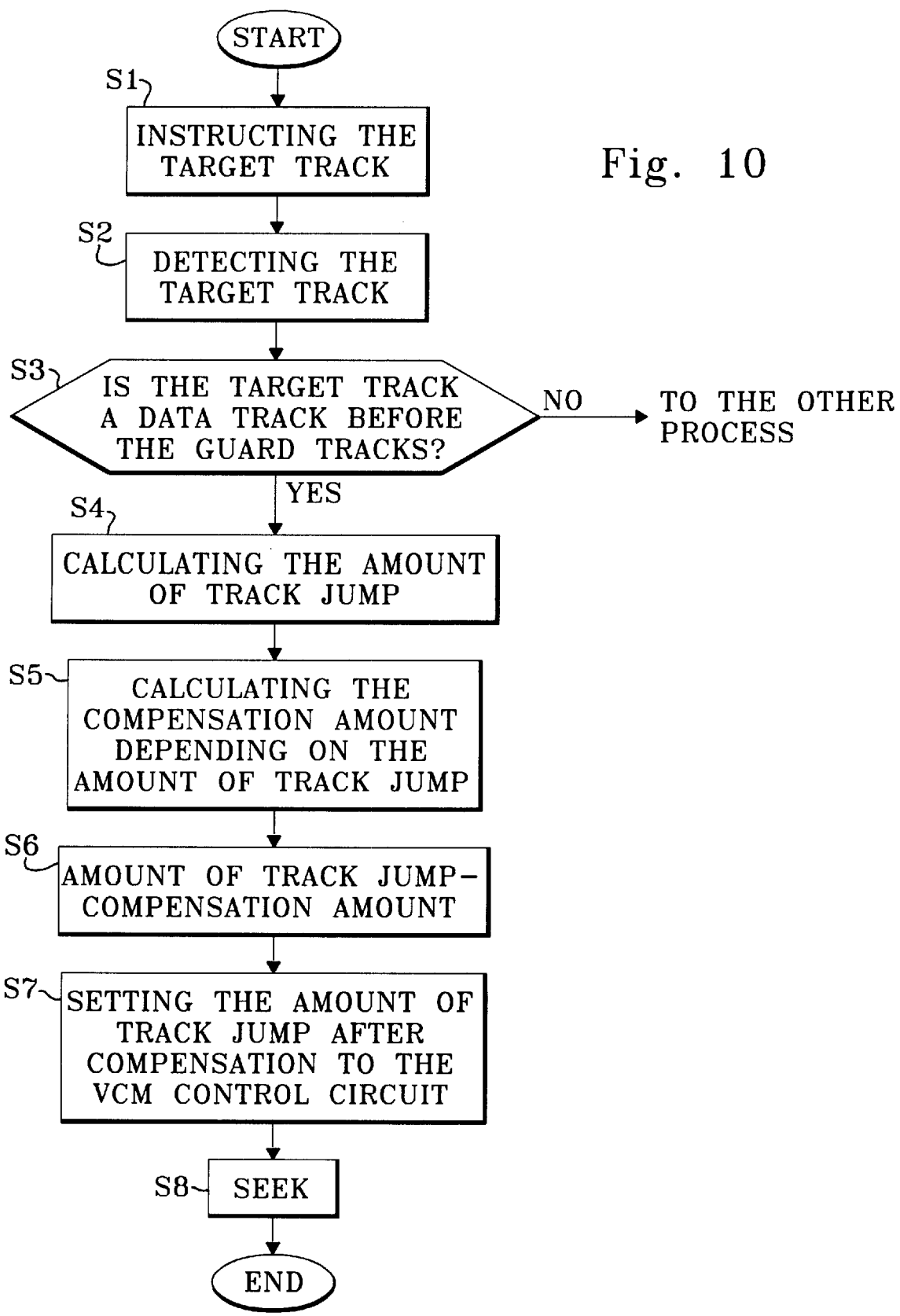
FIG. 10 is a flowchart when seeking is conducted to the track before the guard area.

FIG. 10 is a flowchart for making the seek to the area before the guard area. First, the target track is instructed in step S1 with a system such as a host processing section of the optical disk apparatus or an externally connected personal computer.

In step S2, the data previously tabled in the memory of buffer memory 20 or MPU is retrieved. Step S3 determines whether the instructed target track is the track before the guard area or not. When the target track is determined as the track before the guard area, the ordinary amount of track jump is calculated first in step S4, and the amount of compensation depending on the amount of track jump is calculated in step S5. This characteristic is shown in FIG. 8. Actually, the calculation formula is preferably stored in the memory and the MPU conducts the calculation for the amount of compensation using the calculation formula. When the track is determined not to be the track before the guard area, the other process starts.

In step S6, the amount of compensation is subtracted from each calculated amount of track jump in the case of seeking to the area before the guard area. This characteristic is shown as (2) in FIG. 9. A value of the result is instructed to DSP 15 in step S7, and the carriage 74 is operated via driver 62 and VCM 64 to conduct the seek in step S8.

Therefore, the head is not moved to the guard area by surely moving the head to the data area to recognize the position of the head (optical beam). The head is moved again (if the head cannot reach the target position only with single seek operation) from this position. Thereby, high speed and reliable positioning to the target position can be realized.

Figure 11:
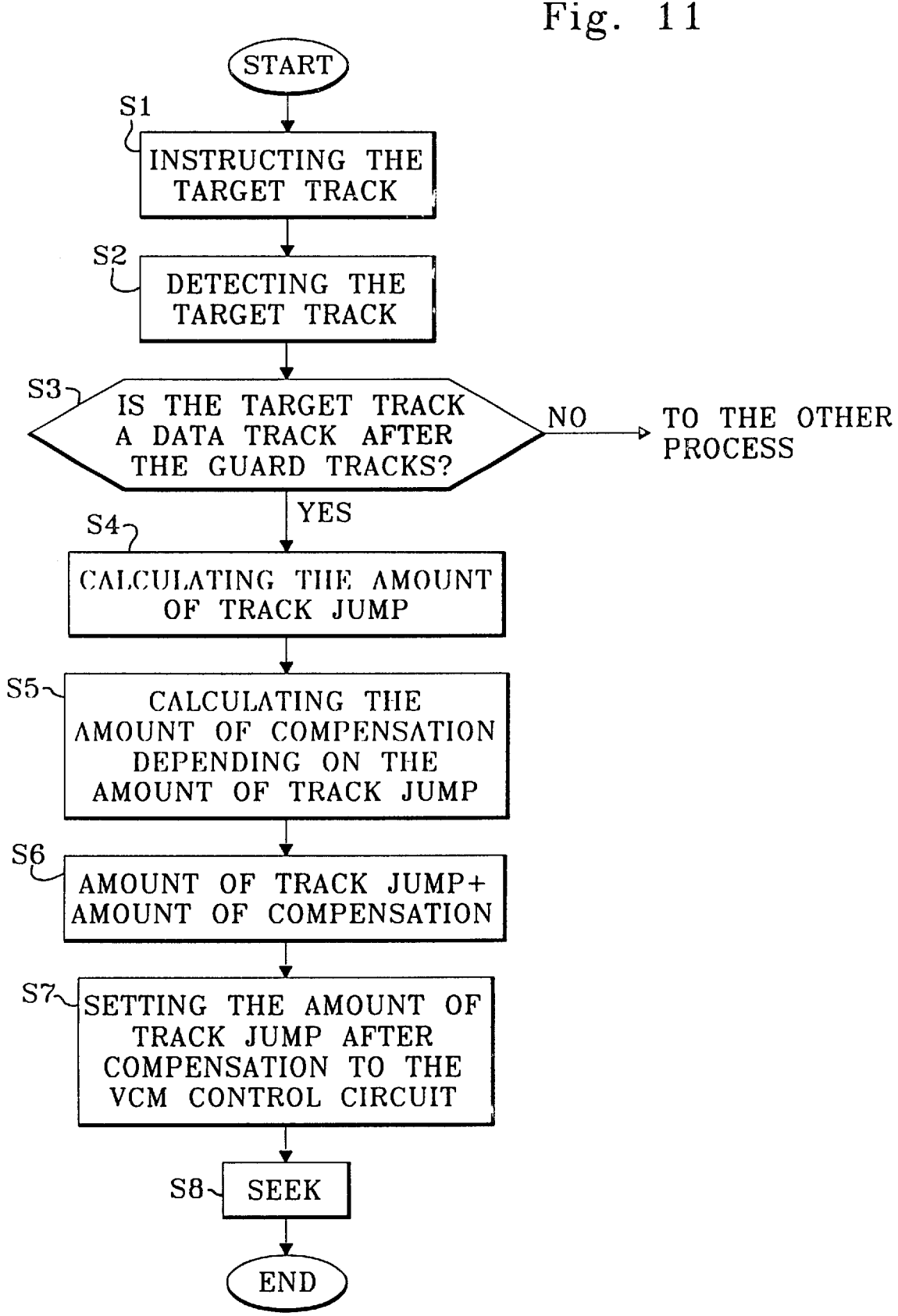
FIG. 11 is a flowchart when seeking is conducted to the track after the guard area.

FIG. 11 is a flowchart for seeking to the area after the guard area. First, the target track is instructed in step S1 by the host processing part of the optical disk apparatus or a system such as an externally connected personal computer. Actually, a calculation formula is stored in the memory and MPU conducts the calculation for the amount of compensation using the calculation formula. Here, when the track is not the track after the guard area, the other process starts.

The MPU retrieves, in step S2, the data in which the instructed target track is tabled. Step S3 determines whether or not the target track is the track after the guard area. When the target track is determined to be the track after the guard area, the ordinary amount of track jump is calculated in step S4 and the amount of compensation depending on the amount of track jump is calculated in step S5. This characteristic is shown in FIG. 8.

In the case of seek to the track after the guard area, the amount of compensation is added from each calculated amount of track jump. This characteristic is shown as (3) of FIG. 9. The MPU instructs the value of the result to DSP 15 in step S7 and DSP 15 operates the carriage 76 via the driver 62 and VCM 64 in order to conduct the seek in step S8.

Therefore, the head is not moved on-track in the guard area by surely moving the head to the data area, to recognize the position of the head. The head is moved again (if the head cannot reach the target position with only a single seek operation) from this position. Thereby, high speed and reliable positioning to the target position can be realized.

Figure 12:
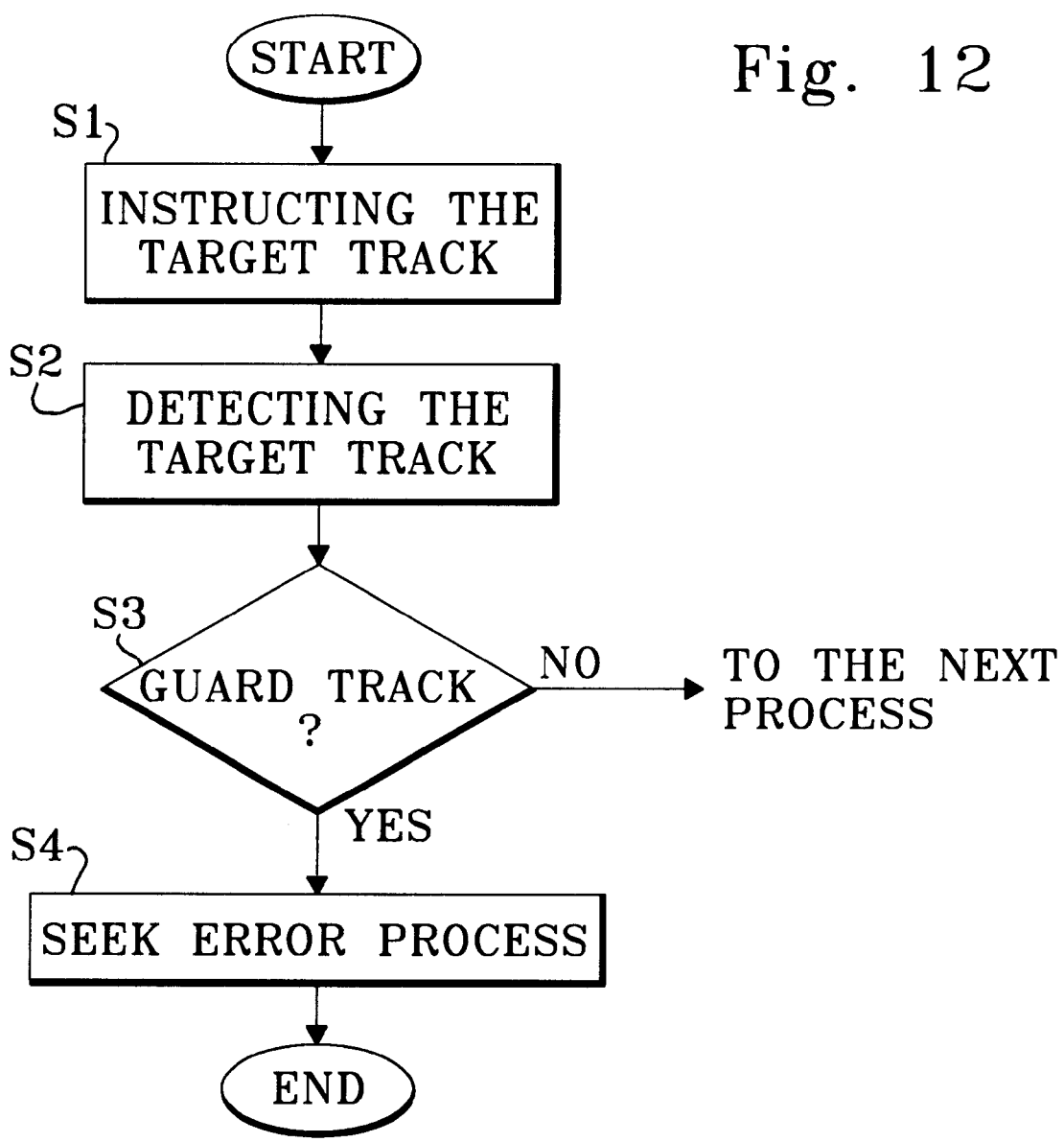
FIG. 12 is a flowchart when seeking to the guard track is instructed.

FIG. 12 is a flowchart useful when seek is instructed to the track of a guard area. First, the target track is instructed in step S1 by the host processing part of the optical disk apparatus or by the system such as an externally connected personal computer.

MPU retrieves, in step S2, the data where the instructed target track is previously tabled. Step S3 determines whether or not the track is a guard area track. When the target track is a guard area track, a seek error report is issued to the host apparatus, the seek error process is conducted in step S4, and operation is terminated without any execution of the seek process. When the target track is not the track in the guard, operation is shifted to the next process.

Figure 13:
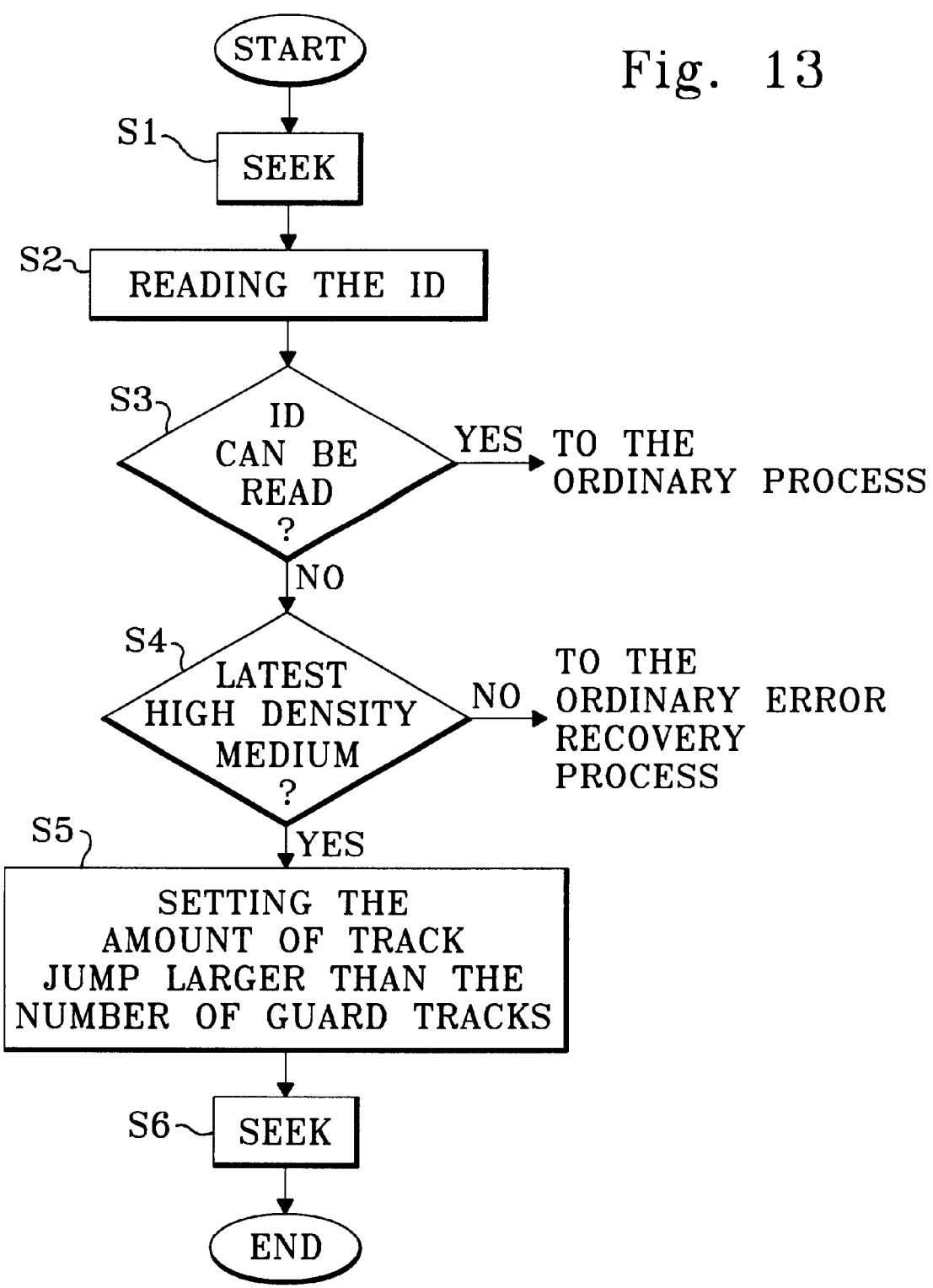
FIG. 13 is a flowchart of the recovery process when seeking is erroneously conducted to the guard track.

FIG. 13 is a flowchart useful when the seek is erroneously conducted to the guard area track. When the moving distance of the carriage is long, the possibility of generating of a track count mistake (measuring mistake for the amount of actual movement) and on-track of the optical beam (head) on the guard area becomes higher.

It is indicated in step S1 that the target track is instructed to suggest the end of seek operation. ID is read in step S2 to detect the seek end position. When ID can be read as a result in step S3, the operation skips to the ordinary process.

If the ID cannot be read, whether a medium is the latest high density medium (namely, medium having the guard area) or not is determined in step S4. When the medium is the ordinary medium (medium having no guard area), ordinary error recovery is performed. When the medium is the latest high density medium, an amount of track jump larger than the number of guard tracks is set to the carriage control circuit in step S5.

As a practical example, about 10 guard tracks are provided continuously as shown in FIG. 2. In this case, 10 or more tracks are instructed to the DSP 15 to operate the carriage 76 via the driver 62 and VCM 64 for the purpose of the seek process in step S6. Thereby, the head is shifted from the guard track.

Therefore, the head can be moved again quickly and accurately to the target position by quickly saving the head from the guard area to recognize the position of the head (optical beam).

FIG. 14 is another flowchart which is useful when the seek is made erroneously to the guard area track. This process is limited only to the case where the spiral track exists. When the head (optical beam) follows the track for a while, the head goes out of the guard area as the medium rotates and the head is isolated from the guard area.

Step S1 instructs the target track and indicates that the seek is completed. The ID is read in step S2 in order to detect the seek end place. When the ID is read in step S3, operation shifts to the ordinary process.

If the ID cannot be read, whether or not the medium is the latest high density medium is determined in step S4. When the medium is the medium of the related art, an ordinary recovery process is conducted, but when the medium is the latest high density medium, the head follows the track continuously in step S5. In step S6, the ID is read only and if the ID cannot be read in step S7, when the number of times of reading operation or time is within the specified number of times or in the specified period in step S8, operation returns to step S5 and the head continuously follows the track to repeat the processes.

When the ID is read within the predetermined period of step S8, namely in more practical terms, within the specified number of tracks, specified number of rotations, specified number of times and specified time, error recovery is successful and operation returns to the ordinary process. When the ID cannot be read, operation is completed erroneously in step S9.

Therefore, seek error does not occur during the predetermined period and the seek can be made again in the step where the ID can be read and accurate positioning can also be made. Moreover, seek error frequency can be lowered.

In the above embodiment, the MPU executes the calculation for compensation and the DSP executes the head moving control depending on the amount of compensated movement, but the DSP can execute the processes up to the head moving control from calculation for compensation. It is also possible to realize such process with a controller or the like having the functions of the MPU and DSP.

In the above embodiment, an optical storage device is considered as an example. Therefore, the objective (condensing) lens for guiding the light beam to a medium and the optical beam itself guided by the objective lens in order to optically execute the data recording, reproducing and erasing are explained as the head, but a magnetic head (inductive head or MR head or the like) can be the head in the magnetic storage device.

As explained above, according to the present invention, if track density is high, highly reliable and high speed access can be realized by improving the seek performance through highly accurate movement and positioning of the head to the storage medium including the guard area having no position information. Therefore, further high density storage can be enabled by utilizing the storage device of the present invention.

Moreover, if a retry process is requested because of a seek error, the process of host system stops or performance thereof is deteriorated when the storage device is operating. Accordingly, a user is placed into the waiting condition, which is undesirable. Therefore, the present invention can provide the effect of not giving such uncomfortable feelings to the user by preventing a seek error in the error recovery process, or by changing the determination criterion of seek error during the error recovery process.

While the principles of the invention have been described above in connection with specific apparatus and applications, it is to be understood that this description is made only by way of example and not as a limitation on the scope of the invention.

We claim:

1. A storage device for use with a storage medium including a data area having position information at least indicating the position for data reproduction, and a guard area not having said position information, comprising:

a head for at least reproducing said data;

head driving means for moving said head from an initial position to a target position on the storage medium; and control means for controlling said head driving means to move said head up to the target position from the initial position; whereby said control means prevents said head from being located at the guard area when the target position is adjacent the guard area.

2. The storage device of claim 1, wherein said control means instructs a compensated amount of head movement to the amount of movement needed to reach the target position from the initial position of said head.

3. The storage device of claim 1, wherein said control means instructs, as a moving control condition, the amount of compensated head movement that is related to the amount of movement required to reach the target position from the initial position of said head.

4. The storage device of claim 3, wherein said control means assures that the amount of compensated head movement increases as said amount of required movement increases.

5. The storage device of claim 1, wherein the guard area is arranged between two data areas.

6. A storage device for use with a storage medium including a data area having position information at least indicating positions to reproduce data, and a guard area not having said position information, comprising:

a head for at least reproducing said data;

head driving means for moving said head from an initial position to a target position on the storage medium; and control means for controlling said head driving means to move said head up to the target position from the initial position; whereby said control means does not move said head when a host issues an instruction to move said head to said guard area.

7. The storage device of claim 6, wherein the guard area is arranged between two data areas.

8. A storage device for use with a storage medium including a data area having position information at least indicating positions to reproduce data, and a guard area not having said position information, comprising:

a head for at least reproducing said data;

head driving means for moving said head from an initial position to a target position on the storage medium; and control means for controlling said head driving means to move said head up to the target position from the initial position; whereby when said head is located at the guard area, from which no position information can be reproduced since said guard area lacks said position information, said control means controls the drive of said head driving means by instructing movement of said head to said data area from the guard area.

9. The storage device of claim 8, wherein the guard area is arranged between two data areas.

10. A storage device for use with a storage medium having a plurality of spiral tracks, the spiral tracks at least including a data area having position information to indicate positions to reproduce data and a guard area not having said position information, comprising:

a head for at least reproducing said data;

head driving means for moving said head from an initial position to a target position on the storage medium; and control means for controlling said head driving means to move said head up to the target position from the initial position, whereby when said head is located at the guard area, from which no position information can be reproduced since said guard area lacks said position information, said control means causes said head to follow the spiral track for a predetermined period, until said head leaves the guard area.

11. The storage device of claim 10, wherein the guard area is arranged between two data areas.

12. The storage device of claim 1, wherein said control means:

calculates the track jump distance between the initial position and the target position;

calculates a compensation amount based upon said track jump distance; and determines if the target position is before the guard area, and if so, said control means subtracts the compensation amount from the track jump distance.

13. The storage device of claim 1, wherein said control means:

calculates the track jump distance between the initial position and the target position;

calculates a compensation amount based upon said track jump distance; and determines if the target position is after the guard area, and if so, said control means adds the compensation amount to the track jump distance.

* * * * *